US008195344B2

(12) United States Patent
Song et al.

(10) Patent No.: US 8,195,344 B2
(45) Date of Patent: Jun. 5, 2012

(54) REMOTE CONTROL SYSTEM AND METHOD FOR CONSTRUCTION EQUIPMENT

(75) Inventors: Jin Suk Song, Seoul (KR); In Kyu Kim, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/142,241

(22) PCT Filed: Dec. 23, 2009

(86) PCT No.: PCT/KR2009/007714
§ 371 (c)(1),
(2), (4) Date: Jun. 24, 2011

(87) PCT Pub. No.: WO2010/074503
PCT Pub. Date: Jul. 1, 2010

(65) Prior Publication Data
US 2011/0257816 A1 Oct. 20, 2011

(30) Foreign Application Priority Data
Dec. 24, 2008 (KR) ........................ 10-2008-0133991

(51) Int. Cl.
*G06F 7/00* (2006.01)
*G06F 19/00* (2011.01)
(52) U.S. Cl. ............................................. 701/2; 701/50
(58) Field of Classification Search ................. 701/2, 50
See application file for complete search history.

(56) References Cited

U.S. PATENT DOCUMENTS 6,836,982 B1 * 1/2005 Augustine ........................ 37/348
7,400,959 B2 * 7/2008 Price et al. ........................ 701/50
(Continued)

FOREIGN PATENT DOCUMENTS

KR 10-0509913 A 10/2004
(Continued)

OTHER PUBLICATIONS

International Search Report dated Jul. 1, 2010, from corresponding International Application No. PCT/KR2009/007714 filed on Dec. 23, 2009.

*Primary Examiner* — Isam Alsomiri
(74) *Attorney, Agent, or Firm* — John D. Veldhuis-Kroeze; Westman, Champlin & Kelly, P.A.

(57) ABSTRACT

A remote control system and a remote control method of a construction machine for reducing a fatigue degree of an operator at the time when the operator controls driving of the construction machine depending on his/her body motion in the remote control system of the construction machine. For this, according to the present disclosure, a value acquired by compensating for a predetermined value $\epsilon_\beta$ with respect to a finger bending angle $\beta_h$ for a palm is tracked by a bending angle $\beta_e$ of a bucket at the time of tracking the position of the bucket depending on hand motion of the operator to reduce a finger bending movement amount of the operator, thereby reducing fatigue. Further, the workspace of the operator is set to be smaller than points which are maximally movable in each of X, Y, and Z-axis directions at the time of setting the workspace of the operator, the workspace of $WS_h$ of the operator set to be small and a machine workspace $WS_e$ match each other, and the operator performs an operation in the workspace which is set to be small, thereby reducing the fatigue.

11 Claims, 10 Drawing Sheets

U.S. PATENT DOCUMENTS

| | | | | |
|---|---|---|---|---|
| 7,890,235 | B2 * | 2/2011 | Self et al. | 701/50 |
| 7,975,410 | B2 * | 7/2011 | Faivre et al. | 37/348 |
| 2006/0271263 | A1 * | 11/2006 | Self et al. | 701/50 |
| 2009/0259373 | A1 * | 10/2009 | Nichols et al. | 701/50 |
| 2011/0137491 | A1 * | 6/2011 | Self et al. | 701/2 |
| 2011/0282519 | A1 * | 11/2011 | Carlsson | 701/2 |

FOREIGN PATENT DOCUMENTS

| | | | |
|---|---|---|---|
| KR | 10-2005-0047329 | A | 5/2005 |
| KR | 10-2005-0072558 | A | 12/2005 |

* cited by examiner

[Fig. 9]
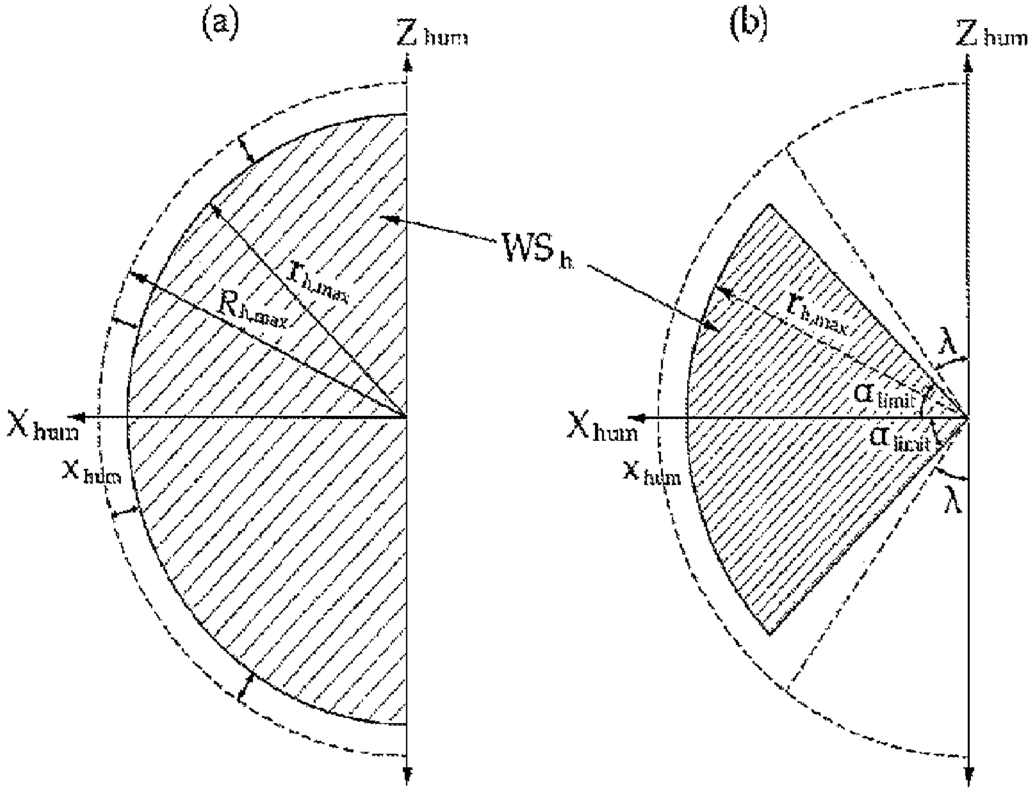

[Fig. 10]
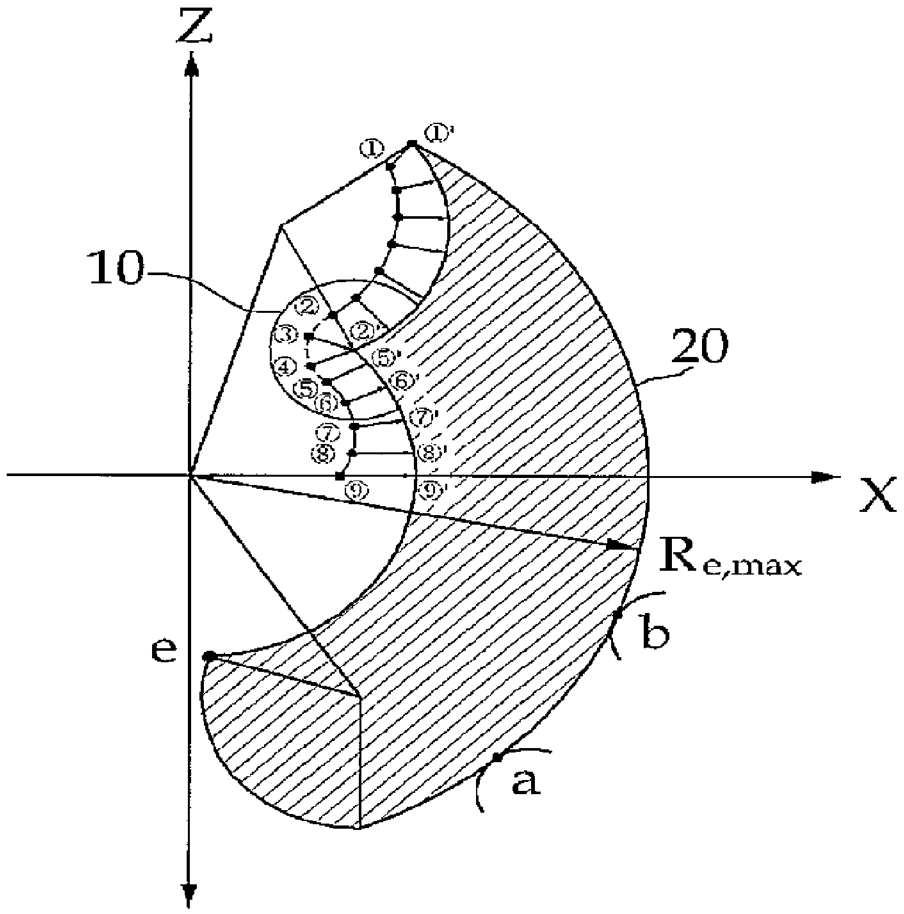

REMOTE CONTROL SYSTEM AND METHOD FOR CONSTRUCTION EQUIPMENT

CROSS-REFERENCE TO RELATED APPLICATION

This Application is a Section 371 National Stage Application of International Application No. PCT/KR2009/007714, filed Dec. 23, 2009 and published, not in English, as WO2010/074503 on Jul. 1, 2010, the contents of which are hereby incorporated by reference in their entirety.

FIELD OF THE DISCLOSURE

The present disclosure relates to a remote control system and a remote control method of a construction machine that can control the construction machine remotely, and more particularly, to a remote control system and a remote control method of a construction machine for reducing a fatigue degree of an operator positioned in a remote area at the time when the operator controls driving of the construction machine depending on his/her body motion.

BACKGROUND OF THE DISCLOSURE

When considering a characteristic of an operation by a construction machine such as a general excavator, operators operate the excavator by operating a manual lever for directly controlling a hydraulic valve.

In general, since the operators can acquire a correlation between bucket motion and lever operation only when they should get a long training course and a long experience, it is very difficult for an unskilled person to operate the construction machine. It is more difficult to sense a load applied to a bucket because only a movement velocity of the bucket, a reaction of an engine to the load, and a rebound pressure transferred to the lever are unique feedbacks for tracking the load.

For this reason, the operator for operating the construction machine should receive a training for operating the construction machine for a long time. Further, since even the operator who receives the training for a long time operates the construction machine with riding on the construction machine, the operator is always exposed to a projected danger such as an injury caused due to a mistake such as misoperation.

For this reason, the current trend is that a demand for a control system in which the operator can operate the construction machine without riding on the construction machine increases and a technology capable of controlling the construction machine remotely is developed depending on the demand.

As such, one of points to be considered when the technology of controlling the construction machine remotely is developed is a demand for a technology that allows the operator to perform an operation for driving the construction machine while minimizing the fatigue degree of the operator at the time of performing the operation for driving the construction machine.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to provide a remote control system and a remote control method of a construction machine for reducing a fatigue degree of an operator at the time when the operator controls driving of the construction machine depending on his/her body motion.

In order to achieve the object, a remote control system of a construction machine includes: a remote device including a plurality of sensors for sensing a finger bending angle $\beta_h$ with respect to a palm of an operator and a wrist position H of the operator, a remote control unit tracking an operation angle $\beta_e$ of a bucket depending on the finger bending angle $\beta_h$ with respect to the palm of the operator and a machine operating position E depending on the wrist position H of the operator, and a remote wireless transmitting and receiving unit wirelessly transmitting the tracked operation angle $\beta_e$ of the bucket or the machine operating position E to the construction machine; and a construction machine including an operation device including a boom, an arm, and a bucket, and an upper swing body, and controlling driving of the upper swing body or the operation device depending on the operation angle $\beta_e$ of the bucket or the machine operating position E received from the remote device, wherein the remote device generates an absolute coordinate system using a rotational center point of an arm of the operator as an original point for setting a workspace, sets an area within a radius smaller than an inputted maximum radius by a predetermined size on a XZ plane as a workspace when a maximum distance to which a wrist reaches in each direction axis of an anteroposterior direction X, a horizontal direction Y, and a longitudinal direction Z is inputted, sets a predetermined angle in a Y-axis direction on the basis of an X axis in an area within a radius smaller than an inputted maximum radius by a predetermined size on an XY plane as the workspace, and thereafter, matches a remote coordinate system and a machine coordinate system depending on the set workspace each other.

Further, according to the exemplary embodiment of the present disclosure, the construction machine drives the upper swing body or the operation device to the machine operating position E by setting a driving velocity to predetermined acceleration at the time of driving the upper swing body or the operation device to the machine operating position E.

In addition, according to the exemplary embodiment of the present disclosure, a partial area approximate to the Y axis outside the workspace on the XY plane is set as an absolute swing area λ, and when the wrist of the operator enters the absolute swing area λ in the workspace, tracking a movement position of the wrist of the operator stops and only a movement direction is tracked to swing the upper swing body at a predetermined swing velocity.

Moreover, according to the exemplary embodiment of the present disclosure, the remote device transmits a swing operation stopping command to the construction machine through the remote wireless transmitting and receiving unit when the wrist position H of the operator deviates from the absolute swing area λ.

Further, according to the exemplary embodiment of the present disclosure, the remote device calculates the swing velocity as a maximum velocity previously set for absolute swing when the wrist position H is positioned on the Y axis and calculates the swing velocity as a minimum velocity previously set for absolute swing when the wrist position H is positioned at the furthest location on the Y axis in the case where the wrist position H of the operator belongs to the absolute swing area λ, calculates the swing velocity varying depending on an approximate degree to the Y axis within the minimum velocity range and the maximum velocity range with respect to the wrist position H when the wrist position H is positioned at the furthest location on the Y axis and within the Y axis, and transmits a command for continuously performing the swing operation at the calculated swing velocity to the construction machine through the remote wireless transmitting and receiving unit.

Further, according to the exemplary embodiment of the present disclosure, the remote device sets a position H' approximated to a point the closest to the workspace as the wrist position H of the operator when the wrist position H of the operator deviates from the set workspace.

Further, according to the exemplary embodiment of the present disclosure, the remote device previously sets an approximate area in the workspace, tracks a velocity and a direction by using a previous velocity and a direction component when the wrist position H of the operator belongs to the approximate area, and wirelessly transmits the tracked velocity and direction information to the construction machine through the remote wireless transmitting and receiving unit.

A remote control method of a construction machine for remotely controlling the construction machine including an operation device including a boom, an arm, and a bucket and an upper swing body in a remote area includes: receiving, by a remote device, a maximum distance to which a wrist is reachable in each direction axis of an anteroposterior direction X, a horizontal direction Y, and a longitudinal direction Z and setting a radius based on a distance smaller than the received maximum distance by a predetermined size as a workspace, and setting a predetermined area on an XY plane as an absolute swing area λ; tracking an operation angle $\beta_e$ of the bucket to track an operation angle $\beta_e$ of the bucket depending on a finger bending angle $\beta_h$ with respect to a palm of the operator and wirelessly transmit the tracked information to the construction machine; executing a position tracking mode to track a machine operating position E and wirelessly transmit the tracked information to the construction machine when a wrist position H of the operator belongs to the workspace; executing an absolute swing mode to recognize that a request for a swing operation is received from the operator and wirelessly transmit the swing operation request to the construction machine when the wrist position H of the operator belongs to the absolute swing area; executing an approximate position tracking mode to track the machine operating position E by setting a position H' approximated to a point the closest to the workspace as the wrist position H of the operator and wirelessly transmit the tracked information to the construction machine when the wrist position H of the operator deviates from the workspace and the absolute swing area; and controlling, by the construction machine, driving of the operation device and the upper swing body in accordance with the tracking information or the swing operation request that is received from the remote device.

Further, according to the exemplary embodiment of the present disclosure, in the tracking of the operation angle $\beta_e$ of the bucket, the operation angle $\beta_e$ of the bucket is tracked by compensating for a predetermined value with respect to the finger bending angle $\beta_h$ with respect to the palm of the operator and when the compensated value is more than a maximum value of the operation angle $\beta_e$ of the bucket, the compensated value is tracked as the maximum value of the operation angle $\beta_e$ of the bucket.

In addition, according to the exemplary embodiment of the present disclosure, in the executing of the absolute swing mode, a command for continuously performing the swing operation is transmitted to the construction machine when the wrist position H of the operator belongs to the absolute swing area λ and a swing operation stopping command is transmitted to the construction machine through the remote wireless transmitting and receiving unit when the wrist position H of the operator deviates from the absolute swing area λ.

According to Technical Solution described above, an operator which is remote from a construction machine can drive the construction machine without riding on the construction machine, such that operational safety of the construction machine is improved.

Further, as the construction machine is driven depending on body motion of the operator, the construction machine can be easily operated.

In addition, by setting a workspace of the operator for controlling the machine to a small size and matching the workspace of the machine with the workspace set to the small size, the operator can control movement and swing up to a maximally movable position even though the operator moves a hand in the workspace set to the small size, thereby reducing a movement amount of the hand by the operation. Therefore, the operator can reduce a fatigue degree at the time of controlling the machine remotely.

Meanwhile, the machine is drive-control led for an upper swing body to swing only when a boom and an arm of the construction machine are not driven, such that an operation device of the construction machine can be prevented from colliding with a surrounding object, and as a result, the operational safety is further improved.

DESCRIPTION OF THE DRAWINGS

FIG. 9 is an exemplary diagram illustrating a workspace of an operator according to an exemplary embodiment of the present disclosure; and FIG. 10 is an exemplary diagram for describing position tracking when a wrist position H of the operator belongs to an approximate area during performing the process of FIG. 7.

DETAILED DESCRIPTION

Figure 1:
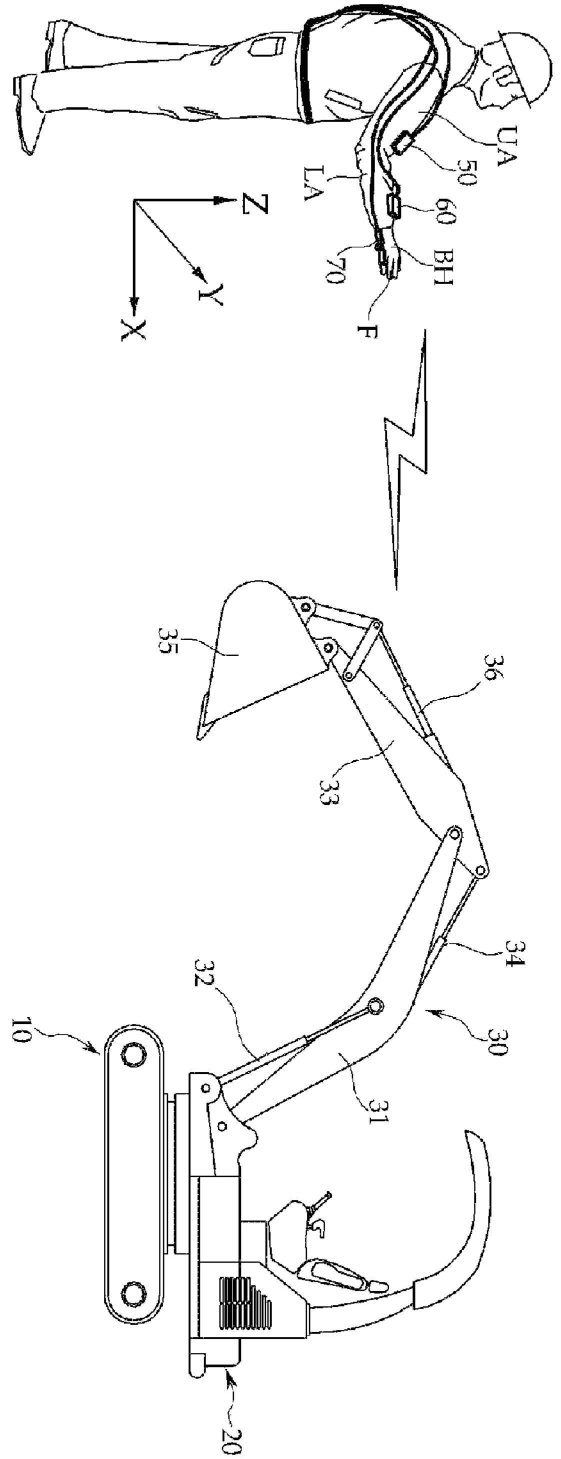
FIG. 1 is a diagram illustrating a remote control system of a construction machine according to an exemplary embodiment of the present disclosure.

Hereinafter, exemplary embodiments of the present disclosure will be described in detail with reference to the accompanying drawings. It should be noted that the same components refer to the same reference numerals anywhere as possible in the drawings. In the following description, specific detailed matters will be described and are provided to the more overall understanding of the present disclosure. Further, in describing the present disclosure, well-known functions or constructions will not be described in detail since they may unnecessarily obscure the understanding of the present disclosure.

Referring to FIG. 1, a remote control system of a construction machine according to an exemplary embodiment of the present disclosure is the system for sensing hand motion by attaching sensors 50, 60, and 70 to a hand of an operator which is positioned remotely from the construction machine and controlling motion of the construction machine remotely depending on the sensed motion.

An excavator is exemplified as the construction machine in the exemplary embodiment, but the spirit of the present disclosure will be able to be applied to even all construction machines with an operation device other than the excavator similarly.

The remote control system of the construction machine capable of controlling the construction machine remotely will be described in detail with reference to FIGS. 1 and 2.

Figure 2:
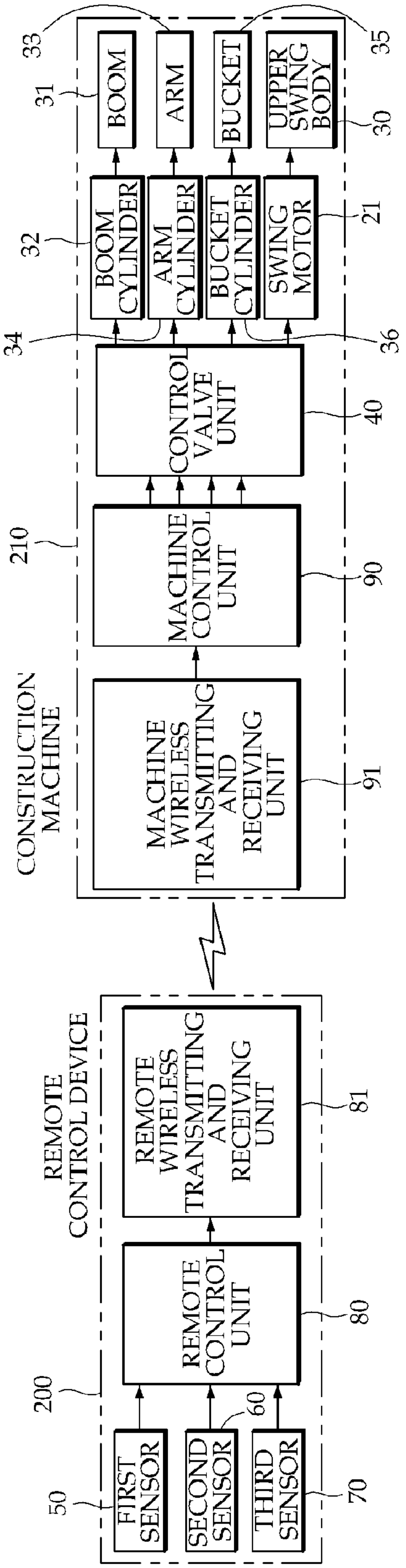
FIG. 2 is a control block diagram of the remote control system of the construction machine shown in FIG. 1.

Referring to FIGS. 1 and 2, the remote control system according to the exemplary embodiment of the present disclosure includes a remote control device 200 including first, second, and third sensors 50, 60, and 70, a remote control unit 80, and a remote wireless transmitting and receiving unit 81 and a construction machine 210 including a machine wireless transmitting and receiving unit 91, a machine control unit 90, a control valve unit 40, a boom cylinder 32, an arm cylinder 34, a bucket cylinder 36, a swing motor 21, a boom 31, an arm 33, a bucket 35, and an upper swing body 20.

First, components of the remote control device 200 and an operation of each component will be described.

The first sensor 50 is attached to an upper arm UA of an operator's arm to sense an angle of the upper arm UA of the arm. More specifically, the first sensor 50 detects a rotational angle of the upper arm UA of the arm around a horizontal axis (Y axis) of the operator. The first sensor 50 may be configured by various known sensors such as an inclinometer, and the like.

The second sensor 60 is provided on a lower arm LA of the operator's arm to detect a rotational angle of the lower arm LA. More specifically, the second sensor 60 senses the rotational angle of the lower arm LA of the arm around the horizontal axis (Y axis) of the operator and the rotational angle of the lower arm LA of the arm around the longitudinal axis (Z axis) of the operator. Since the second sensor 60 should be able to sense the rotational angles of two or more axes as described above, an orientation sensor capable of sensing the rotational angles of three axes may be used.

The third sensor 70, which is provided in a hand to sense an angle between the back of the hand BH and a finger F, that is, a hand bending angle $\beta$, may adopt an incremental rotary encoder, and the like. The hand bending angle $\beta$ may be expressed as a rotational angle of the finger around the horizontal axis Y of the operator on the basis of the back of the hand BH.

The remote control unit 80 tracks the position of the bucket by using a bending angle of the operator's finger on the basis of values detected by the sensors and tracks a coordinate value $E(X_e, Y_e, \text{and } Z_e)$ of an operational position of the machine depending on a coordinate value $H(X_h, Y_h, \text{and } Z_h)$ of the position of an operator's wrist. Further, by transmitting the coordinate value $E(X_e, Y_e, \text{and } Z_e)$ of the tracked operation position of the machine to the construction machine 210 through the remote wireless transmitting and receiving unit 81, the operation of the operation device of the construction machine is controlled to correspond to the arm motion of the operator. The control operation of the remote control unit 80 will be described in detail with reference to description of FIGS. 4 to 8.

The remote control unit 80 controls driving of the boom 31 or the arm 33 and swing driving of the upper swing body 20 not to be implemented simultaneously. When the boom 31 and the arm 33 are driven while the upper swing body 20 swings, the boom 31, the arm 33, and the bucket 35 may collide with a surrounding object of the construction machine, and thus, operational safety is improved by preventing the collision. In particular, since the operator inspects around the construction machine carefully while the operator rides on the construction machine, an accident in which the boom 31 or the arm 33 and the upper swing body 20 collide the surrounding object occurs rarely even though the boom 31 or the arm 33 and the upper swing body 20 swing simultaneously, but the surrounding object of the construction machine may not be sufficiently determined at the time when the operator controls the construction machine at a remote area from the construction machine.

Further, in the case of controlling the construction machine remotely, since the construction machine is controlled using the motion of the operator's arm, driving control of the construction machine is not precise, and as a result, the operation device 30 of the construction machine easily collides with the surrounding object. For this reason, in the remote control system according to the exemplary embodiment of the present disclosure, driving of the boom 31 and the arm 33 which causes a rotational radius of the construction machine to be largely varied is prevented from being implemented at the same time as swing of the boom 31 an the arm 33, thereby maximally securing the operational safety.

More specifically, the remote control unit 80 receives the positional coordinate value depending on sensing of the motion of the wrist position H of the operator and verifies whether the upper swing body 20 is driven before performing a position tracking mode or an approximate position tracking mode depending on the received wrist position H of the operator, thereby preventing the position tracking mode or the approximate position tracking mode from being performed when the upper swing body 20 is driven.

Further, the remote control unit 80 judges whether the boom or the arm is driven before performing an absolute swing mode when the positional coordinate value depending on the sensing of the motion of the wrist position H of the operator belongs to a swing area, and as a result of the judgment, disables the absolute swing mode from being performed when the boom or the arm is driven.

On the contrary, since the bucket 35 does not largely influence the rotational radius of the construction machine, when a finger bending angle $\beta_h$ is inputted from the sensors 50, 60, and 70 by hand motion of the operator and thus the position of the bucket operates by tracking the finger bending angle, the remote control unit 80 transmits information on the finger bending angle $\beta_h$ to the machine control unit 90 regardless of driving or not other operation devices to thereby drive the bucket 35.

Next, components of the construction machine 210 and an operation of each component will be described.

The construction machine 210 includes a lower traveling body 10 with a transport means such as a track provided in a lower part thereof and an upper swing body 20 swingably installed in the lower traveling body 10. The upper swing body 20 is swung by a swing motor 21. Meanwhile, the boom 31, the arm 33, and the bucket 35 are provided in the upper swing body 20 as the operation device 30 and each are driven by the boom cylinder 32, the arm cylinder 34, and the bucket cylinder 36 which are actuators.

Meanwhile, the boom cylinder 32, the arm cylinder 34, the bucket cylinder 36, and the swing motor 21 are driven by a working fluid and a flow direction of the working fluid is controlled by the control valve unit 40, such that the working fluid is supplied to each of the cylinders 32, 34, and 36 and the swing motor 21.

The control valve unit 40 routinely changes a passage by moving a spool with a pilot pressure oil, but in recent years, an electronic control valve system has been developed, which changes the passage by moving the spool in accordance with an electrical signal by using a solenoid and an amplifier. In the exemplary embodiment, the electronic main control valve unit 40 will be described as an example, but unlike the exemplary embodiment, a method of electronically implementing a pilot control valve controlling a flow direction of the pilot pressure oil for applying a signal pressure to the main control valve unit 40 while maintaining the existing hydraulic main control valve unit 40 as it is will also be included in the spirit of the present disclosure.

As such, by using the electronic control valve unit 40, the passage of the electronic control valve unit 40 is changed by a signal transmitted from the machine control unit 90, and as a result, the flow direction of the working fluid supplied to each of the cylinders 32, 34, and 36 and the motor 21 is controlled.

The machine wireless transmitting and receiving unit 91 receives remote control information transmitted from the remote control device 200.

When the machine control unit 210 receives the remote control information for driving the operation devices such as the boom 31, the arm 33, and the bucket 35, and the upper swing body 20 from the remote control device 200, the machine control unit 210 transfers commands for driving the operation devices and the upper swing body 20 to the boom cylinder 32, the arm cylinder, 34, the bucket cylinder 36, and the swing motor 21 in accordance with the received remote control information, thereby controlling the corresponding devices to be driven.

Hereinafter, a process for the remote control device 200 to control the operation of the construction machine 210 in the remote control system configured as above will be described with reference to FIGS. 4 to 8.

Figure 4:
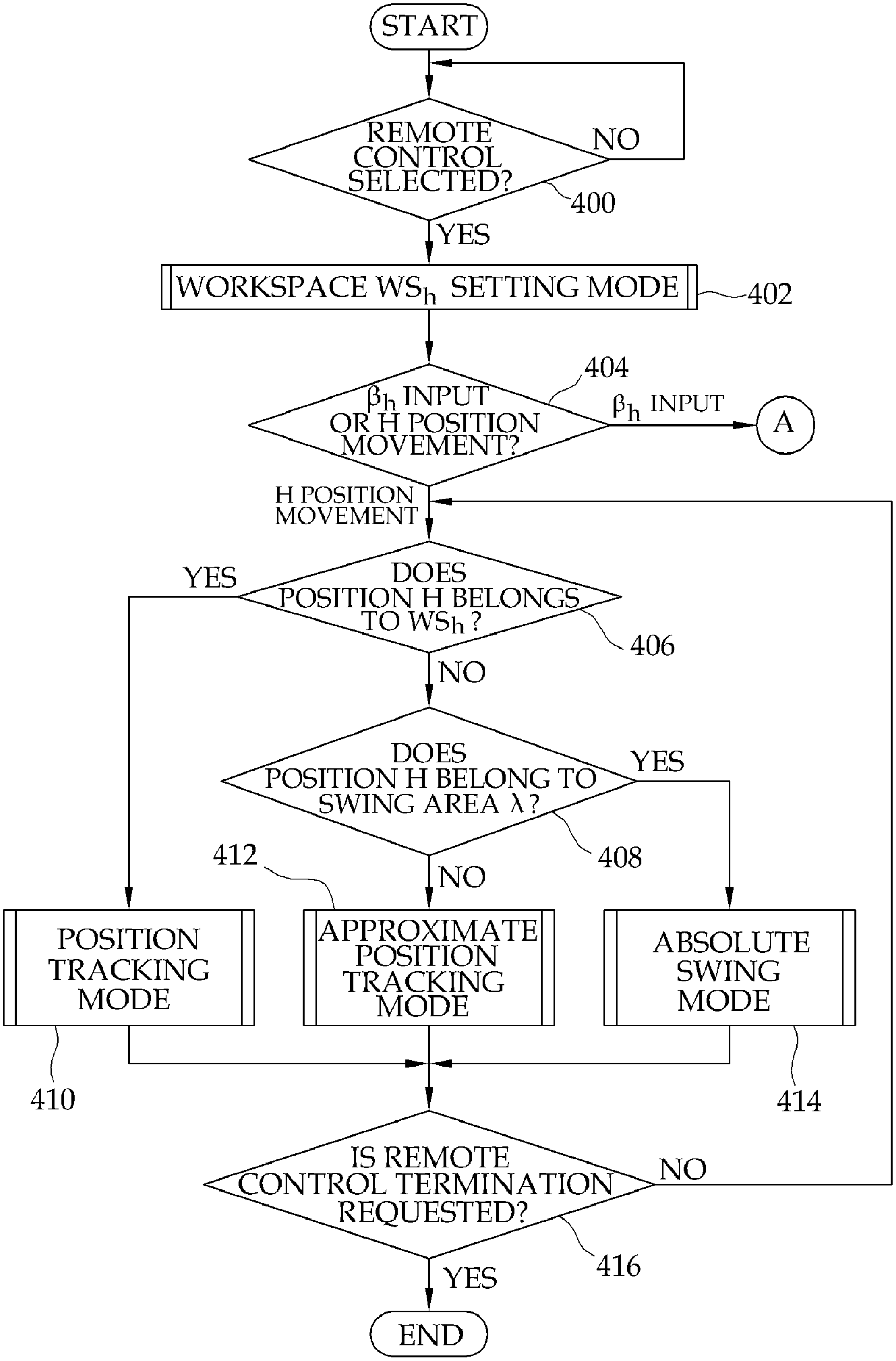
FIG. 4 is a flowchart illustrating a process of remotely controlling the construction machine in a remote equipment according to an exemplary embodiment of the present disclosure.
Figure 5:
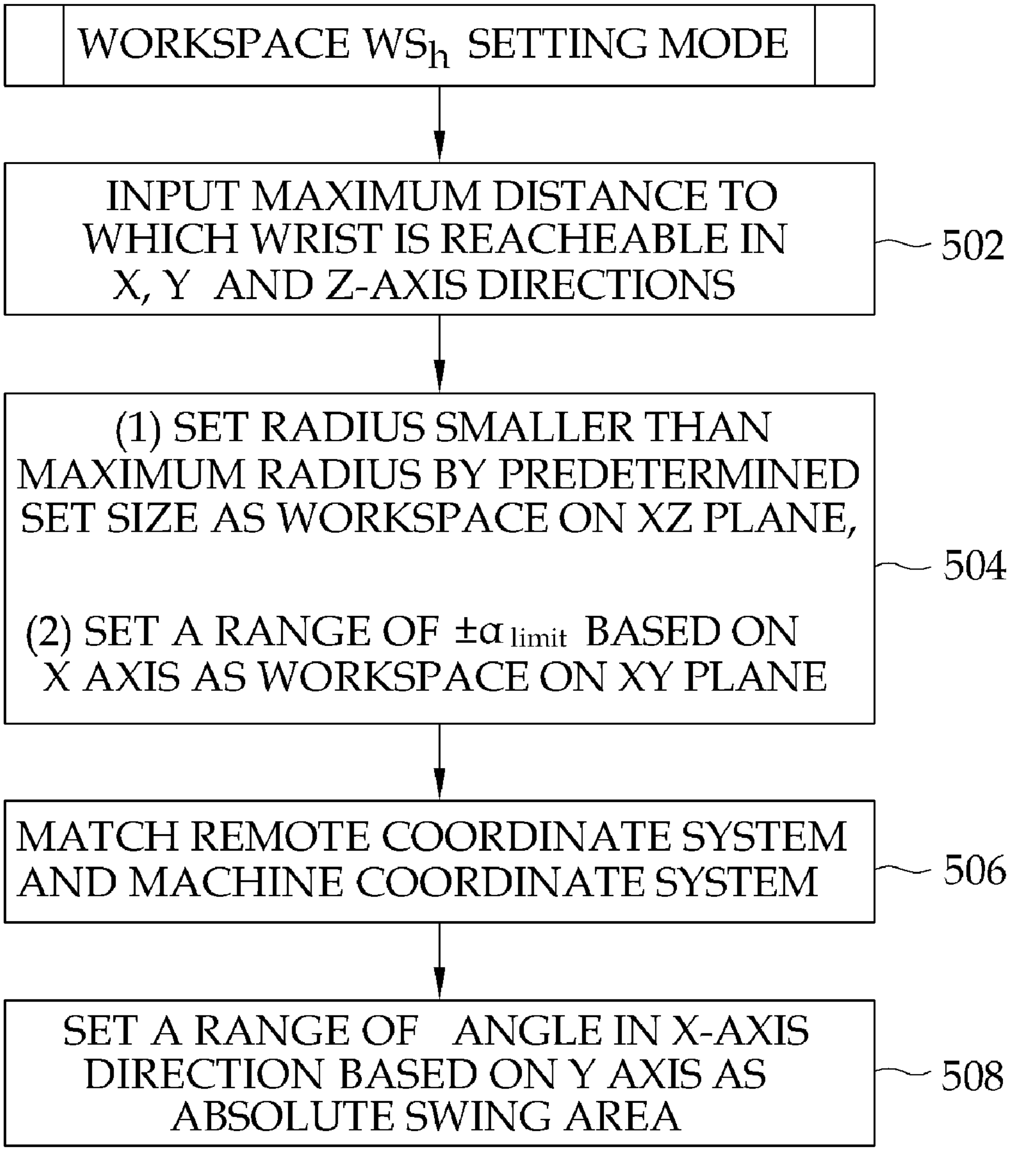
FIG. 5 is a flowchart illustrating a process of performing a workspace setting mode according to an exemplary embodiment of the present disclosure.
Figure 6:
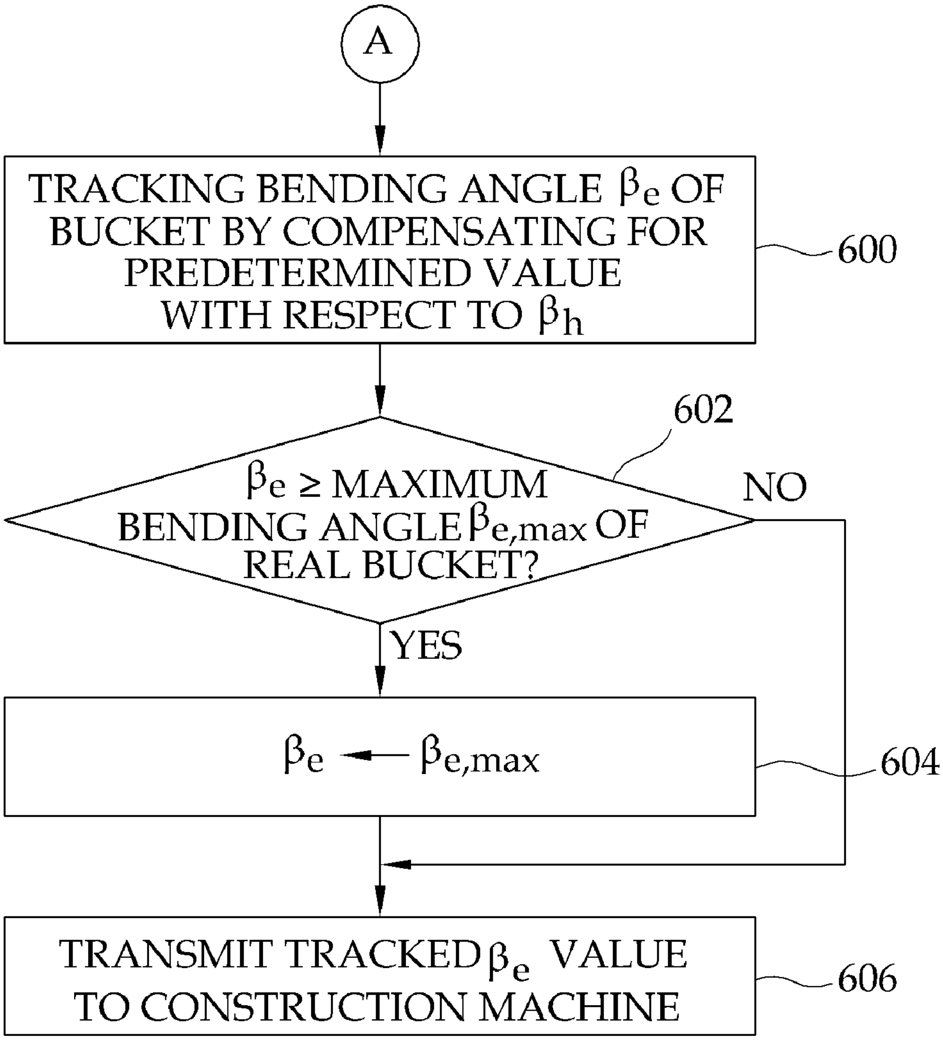
FIG. 6 is a flowchart illustrating a process of tracking the position of a bucket depending on hand motion of an operator according to an exemplary embodiment of the present disclosure.

First, referring to FIG. 4, when the operator performs selection for remotely controlling the construction machine in step S400, the process proceeds to step S402 and the remote control unit 80 performs a workspace $WS_h$ setting mode. The workspace setting mode will be described with reference to FIGS. 5 and 9. FIG. 5 is a flowchart illustrating a process of performing a workspace setting mode according to an exemplary embodiment of the present disclosure, and FIG. 9 is an exemplary diagram illustrating a workspace $WS_h$ of an operator according to an exemplary embodiment of the present disclosure.

Figure 3:
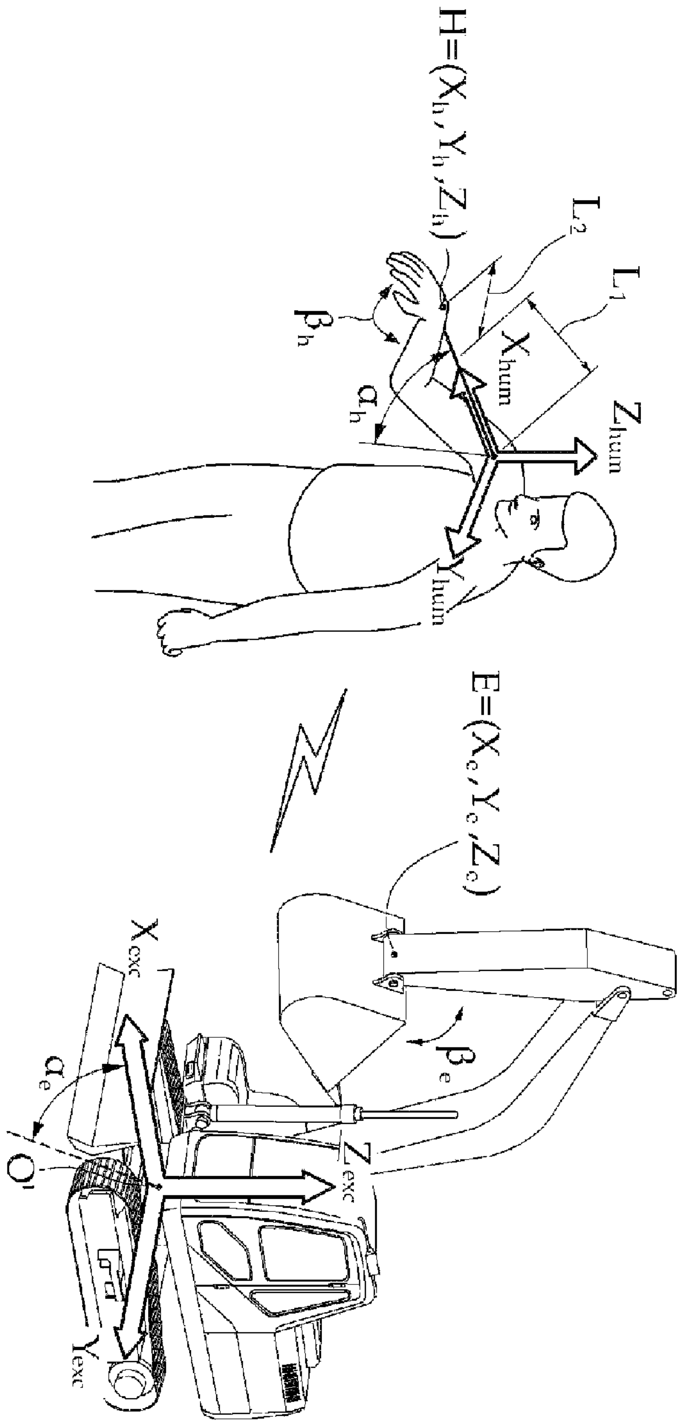
FIG. 3 is a diagram for describing a remote coordinate system and a machine coordinate system of the remote control system of the construction machine shown in FIG. 1.

In step S500, the remote control unit 80 requests the operator to set a remote coordinate system and a remote tracking point RP. The request may be notified to the operator through a display unit. Therefore, the operator inputs a remote original point O of the remote coordinate system, and X, Y, and Z-axis directions and the remote tracking point RP of the remote coordinate system. In this case, the information may be inputted through the display unit. In the exemplary embodiment, as described above, the remote original point O is set to a shoulder, the remote tracking point RP is set to an end of the lower arm LA, that is, the wrist, and the X, Y, and Z-axis directions are set as shown in FIG. 3. That is, the remote control unit 80 generates an absolute coordinate system using a rotational center point of the operator's arm as an original point.

In step S502, the remote control unit 80 requests an input of a maximum distance $X_{h,mux}$, $Y_{h,mux}$, and $Z_{h,mux}$, which the wrist position of the operator on each of direction axes ($X_{hum}$ axis, $Y_{hum}$ axis, and $Z_{hum}$ axis) in an anteroposterior direction X, a horizontal direction Y, and a longitudinal direction Z it the remote original point O, that is, the remote tracking point RP can reach and receives a value for the input.

Thereafter, in step 504, the remote control unit 80 calculates a maximum radius $R_{h,mux}$ inputted on an XZ plane as shown in <Equation 1> below, sets an area within a radius $r_{h,mux}$ smaller than the calculated maximum radius by a predetermined size as the workspace $WS_h$, and sets an angle range $\alpha_{limit}$ previously set in a Y-axis direction on the basis of an X axis in the area within the radius $r_{h,mux}$ smaller than the maximum radius $R_{h,mux}$ inputted on an XY plane by the predetermined size as the workspace. In this case, the radius $r_{h,mux}$ of the workspace may be calculated as shown in <Equation 2> below.

$$R_h=\sqrt{x_h^2+y_h^2+z_h^2}$$

$$R_{h,mux}\cong x_{h,mux}\cong y_{h,mux}\cong z_{h,mux} \quad \text{[Equation 1]}$$

$$r_{hmux}=\epsilon_h R_{hmux}(\epsilon_h\leqq 1) \quad \text{[Equation 2]}$$

As shown in <Equation 2>, in the present disclosure, the radius $r_{h,mux}$ smaller than the maximum radius is acquired by setting $\epsilon_r$ to a value smaller than 1 for operator's convenience of operation. The radius $r_{h,mux}$ becomes a radius of the workspace $WS_h$ of the operator. That is, as shown in FIGS. 9(*a*) and 9(*b*), the workspace $WS_h$ may be defined by the angle range $\alpha_{limit}$ previously set in the Y-axis direction on the basis of the X axis and the radius $r_{h,mux}$ smaller than the maximum radius $R_{h,mux}$ by the predetermined size.

That is, as shown in FIG. 9, the workspace is not set according to the maximum radius and the angle, however, the workspace is set by the radius smaller than the maximum radius and the predetermined angle range $\alpha_{limit}$ and the operator performs the operation in the set workspace to track a maximum operation position of the machine without extending his/her hand up to a maximum movable point.

In step 506, the remote coordinate system depending on the set workspace and a machine coordinate system are matched with each other.

The reason for setting the remote workspace of the operator through steps 502 to 506 is to find a mapping reference point when matching the remote coordinate system and the machine coordinate system each other. For example, a maximum point at an $X_h$-axis direction position of the remote tracking point RP in the remote coordinate system is mapped to a maximum movement point in an $X_e$-axis direction of a machine tracking point CP in the machine coordinate system, and a minimum point at the $X_h$-axis direction position of the remote tracking point RP in the remote coordinate system is mapped to a minimum movement point in the $X_e$-axis direction of the machine tracking point CP in the machine coordinate system. In addition, the remote coordinate system and the machine coordinate system are matched with each other by a method of evenly subdividing points between a maximum point and a minimum point in an X-axis direction. The Y axis and the Z axis, and the hand bending angle are also mapped in the same manner as the X axis. Herein, in the machine coordinate system, a lower end of a swing bearing is set as a machine original point O', and the $X_e$-axis direction is set as a forward direction of the machine, $Y_e$-axis direction is set as a leftward direction of the machine, the $Z_e$-axis direction is set as an upward direction of the machine, and an end of the arm 33 is set as the machine tracking point CP. Hereinafter, the machine tracking point CP and a machine operating position E have the same positional coordinate value and are described as the same meaning.

Meanwhile, when the process proceeds to step S508, an area within a angle range (λ) previously set in the X-axis direction on the basis of the Y axis on the XY plane is set as an absolute swing area. At this time, the absolute swing area is the area for inputting a request for controlling a swing operation of the construction machine. When the wrist position $H(X_h, Y_h, Z_h)$ of the operator belongs to this area, tracking an absolute coordinate position stops and a command for the swing operation is given to the construction machine. Further, when the wrist position $H(X_h, Y_h, Z_h)$ of the operator deviates from the absolute swing area, a swing operation stopping command is generated and the absolute coordinate position is tracked again. The control operation in the absolute swing area will be described in detail in a description of FIG. 7 below.

Herein, referring back to FIG. 4, when the execution of the workspace $WS_h$ setting mode is completed as described above, the process proceeds to step 404 to examine whether the finger bending angle $\beta_h$ or the position value depending on the wrist position H of the operator is inputted from the sensors 50, 60, and 70 by the hand motion of the operator.

If the finger bending angle $\beta_h$ is inputted, the process proceeds to (A) and thus, the position of the bucket operates by tracking the finger bending angle. Hereinafter, referring to FIG. 6, the tracking operation of the bucket position depending on the hand motion of the operator will be described.

In step S600 to which the process proceeds if the finger bending angle $\beta_h$ is inputted, the remote control unit 80 compensates for a previously set predetermined value $\epsilon_\beta$ with respect to the finger bending angle $\beta_h$, such that a bending angle $\beta_e$ of the bucket with respect to the arm of the construction machine is tracked as shown in <Equation 3>.

$$\beta_e \leftarrow \varepsilon_\beta \frac{\beta_{e,max}}{\beta_{h,max}} \beta_h \ (\varepsilon_\beta \geq 1) \quad \text{[Equation 3]}$$

Herein, $\beta_h$ represents the finger bending angle of the operator, $\beta_e$ represents the bending angle of the bucket with respect to the arm of the construction machine, $\beta_{e,max}$ represents a maximum bending angle of the bucket, $\beta_{h,max}$ represents a maximum bending angle of the finger, and $\epsilon_\beta$ represents the previously set compensation value.

When the bending angle $\beta_e$ of the bucket is tracked, the process proceeds to step S602 to examine whether the tracked bending angle $\beta_e$ of the bucket is equal to or more than the maximum bending angle $\beta_{e,max}$ of the bucket at which the bucket can be actually bent maximally.

At this time, if the bending angle $\beta_e$ of the bucket is equal to or more than the maximum bending angle $\beta_{e,max}$ of the bucket, the process proceeds to step S604 and thus, the maximum bending angle $\beta_{e,max}$ of the bucket is tracked as the bending angle $\beta_e$ of the bucket. Thereafter, the process proceeds to step S606 to wirelessly transmit information on the maximum bending angle $\beta_{e,max}$ of the bucket to the construction machine 210.

However, if the bending angle $\beta_e$ of the bucket is less than the maximum bending angle $\beta_{e,max}$ of the bucket, the process proceeds to step S606 to wirelessly transmit information on the bending angle $\beta_e$ of the bucket tracked in step 600 to the construction machine 210.

Meanwhile, without compensating for the predetermined value with respect to the finger bending angle $\beta_h$, the bending angle $\beta_e$ of the bucket with respect to the arm of the construction machine may be tracked as shown in <Equation 4> below.

$$\beta_e = \frac{\beta_{e,max}}{\beta_{h,max}} \beta_h \quad \text{[Equation 4]}$$

In the case of tracking the bending angle $\beta_e$ of the bucket as shown in <Equation 4>, the finger bending operation required to generate the bending angle $\beta_e$ of the bucket may increase a fatigue degree of the operator.

Therefore, in the present disclosure, the finger bending angle is compensated by the $\epsilon_\beta$ value and the bending angle $\beta_e$ of the bucket is tracked in accordance with a maximum bending ratio between the maximum bending angle $\beta_{e,max}$ of the bucket and the maximum bending angle $\beta_{h,max}$ of the finger, such that the a bending movement amount of the operator's finger is reduced, thereby reducing the fatigue.

For example, assuming that the $\epsilon_\beta$ value is set to 2, the maximum bending angle $\beta_{e,max}$ of the machine is 90° and assuming that the maximum bending angle $\beta_{e,max}$ of the machine and the finger bending angle $\beta_{h,max}$ of the operator are the same as each other, the operator can control the bucket of the machine to be bent at 90° even by bending the finger only at 45°. That is, as the compensation value, the $\epsilon_\beta$ value increases, the bending movement amount of the operator's finger can be reduced.

Herein, referring back to FIG. 4, when the positional coordinate value depending on sensing the motion of the wrist position H of the operator is inputted as the examination result of step S404, it is examined whether the wrist position H of the operator inputted in step S406 belongs to the workspace $WS_h$.

If the inputted wrist position H of the operator belongs to the workspace $WS_h$, the process proceeds to step S410 to execute the position tracking mode, and if not, the process proceeds to step S408 to examine whether the inputted wrist position H of the operator belongs to the absolute swing area. If the wrist position H belongs to the absolute swing area, the process proceeds to step S414 to execute the absolute swing mode, and if not, the process proceeds to step S412 to execute the approximate position tracking mode. Hereinafter, the operations in the position tracking mode, the approximate position tracking mode, and the absolute swing mode will be described in detail.

Position Tracking Mode

In the position tracking mode as a mode of tracking the machine operating position E depending on the wrist position H of the operator, the machine operating position E can be tracked as shown in <Equation 5> below.

$$H = \begin{bmatrix} x_h \\ y_h \\ z_h \end{bmatrix}, \quad R_{h,max} = \begin{bmatrix} R_{h,max} & 0 & 0 \\ 0 & R_{h,max} & 0 \\ 0 & 0 & R_{h,max} \end{bmatrix} \quad \text{[Equation 5]}$$

-continued $$E=\begin{bmatrix}x_e\\y_e\\z_e\end{bmatrix},\quad R_{e,max}=\begin{bmatrix}x_{e,max}&0&0\\0&y_{e,max}&0\\0&0&z_{e,max}\end{bmatrix}$$

$$E=\frac{R_{e,max}}{R_{h,max}}H\ (\text{if } |\alpha|<\alpha_{limit})$$

Referring to <Equation 5> shown above, the machine operating position E can be acquired. At this time, $R_{e,max}$ represents a maximum radius to which the end part of the arm of the excavator is movable, $R_{h,max}$ represents a maximum radius to which the wrist position H of the operator is movable, and $\alpha$ represents an angle of the wrist position H of the operator in ±Y-axis directions on the basis of the X axis on the XY plane of the remote coordinate system.

It is verified whether the upper swing body 20 is driven before executing the position tracking mode, and if the upper swing body 20 is driven, the position tracking mode is not executed. Therefore, if the boom and the arm are not driven, swing is driven.

Approximate Position Tracking Mode

In the approximate position tracking mode which is executed when the wrist position H of the operator does not belong to both the absolute swing area and the workspace $WS_h$, the wrist position H is approximated to the closest point to the workspace when the wrist position H deviates from the $r_{h,max}$ range with reference to FIG. 9.

As such, in the present disclosure, when the machine operating position E tracked using the wrist position H deviates from the workable space, the machine operating position E is approximated to the closest point to the workable space, that is, a coordinate value.

However, when the wrist position H of the operator moves on the trajectory of ①->②->③->④->⑤->-⑥>-⑦>-⑧>⑨ in the workable space shown in FIG. 10, all the points deviate from the workspace $WS_h$, and as a result, the wrist position H will be approximated to ①'->②'->③'->④'->⑤'->⑥'->⑦'->⑧'->⑨' which are coordinates the closest to the workspace $WS_h$ at each position.

In this case, since the wrist position H is approximated to the same position ②' at positions ②, ③, and ④, even though the operator continuously lowers his/her arm in order to operate the boom and the arm downwards, the boom and the arm of the machine stops temporarily at position ②' which is the middle position. Accordingly, the machine is not continuously controlled but rattles and stops and thereafter, the machine will operate again from position ⑤.

That is, when the approximated position corresponds to inflection points ①, d, and e, a previous velocity and a direction component of the wrist position H of the operator are tracked to continuously control the machine in a driving direction.

As a result, in the present disclosure, when the approximated machine operating position E corresponds to the inflection points because the wrist position H of the operator does not belong to the workspace, an approximate area 11 for continuously tracking the machine is set in advance.

Figure 7:
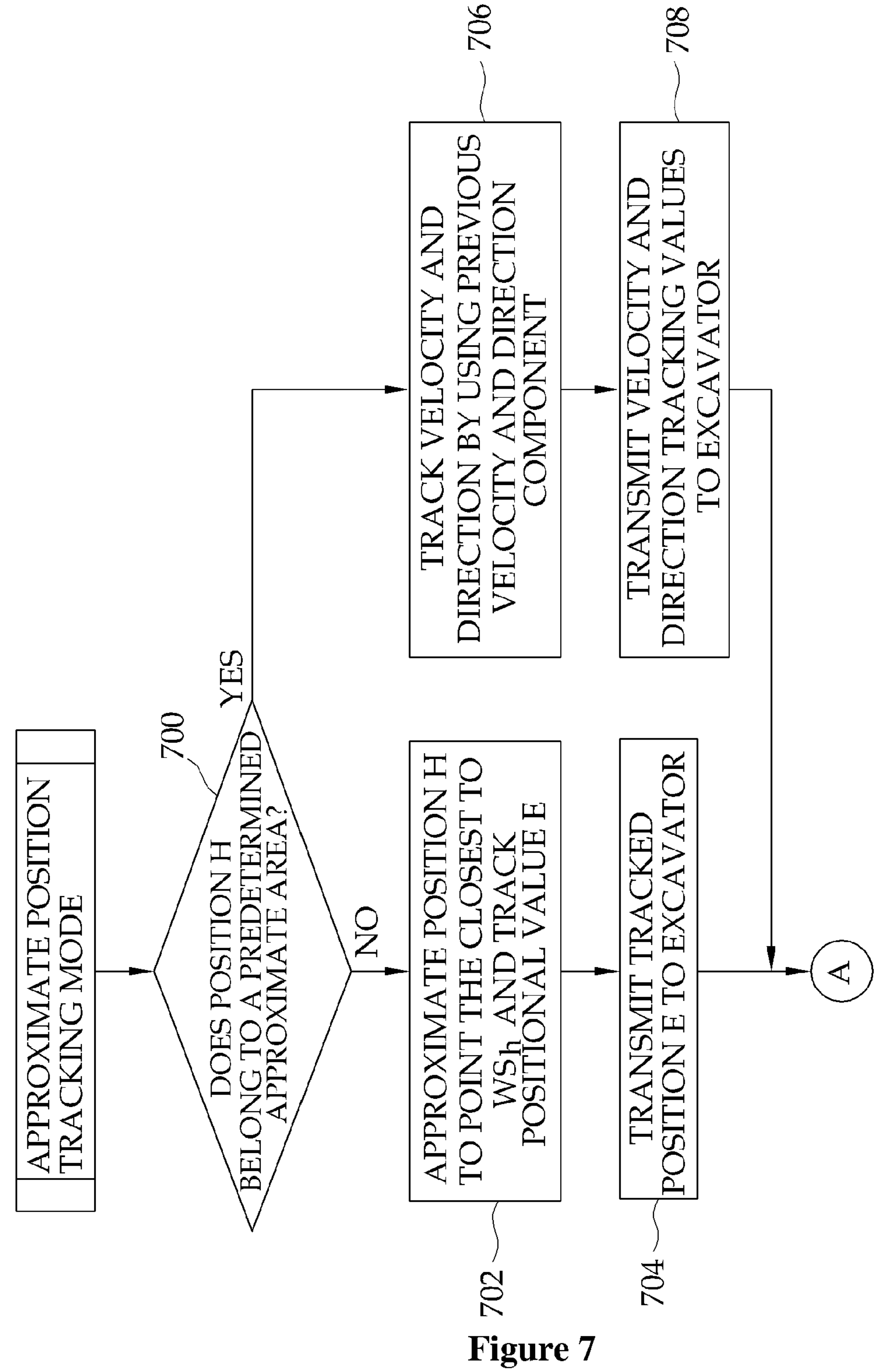
FIG. 7 is a flowchart illustrating a process of performing an approximate position tracking mode according to an exemplary embodiment of the present disclosure.
Figure 8:
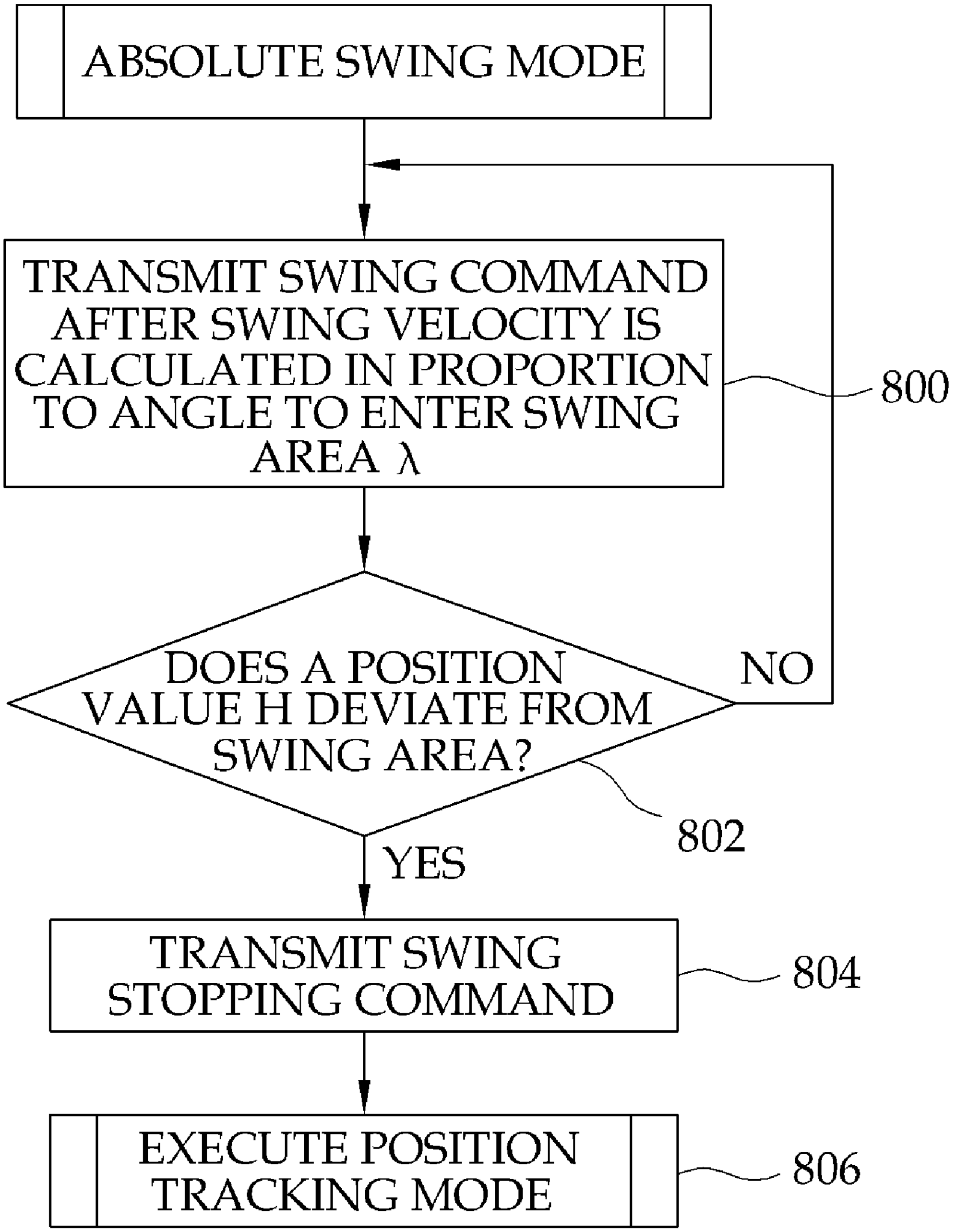
FIG. 8 is a flowchart illustrating a process of performing an absolute swing mode according to an exemplary embodiment of the present disclosure.

Hereinafter, referring to FIG. 7, the operation in the approximate position tracking mode will be described.

In step S700, it is examined whether the wrist position H of the operator belongs to the previously set approximate area.

If the wrist position H of the operator belongs to the approximate area, the process proceeds to step S706 to track a velocity and a direction by using the previous velocity and the direction component and thereafter, the process proceeds to step S708 to wirelessly transmit the tracked velocity and direction values to the construction machine 210.

Meanwhile, if the wrist position H of the operator does not belong to the previously set approximate area as the examination result of step S700, the process proceeds to step 702 to approximate the wrist position H to the closest point H' to the workspace and thereafter, the machine operating position E is tracked as shown in <Equation 6> below in accordance with the approximated position H'.

[Equation 6]

$$H'=\begin{bmatrix}x'_h\\y'_h\\z'_h\end{bmatrix},\quad R_{h,max}=\begin{bmatrix}R_{h,max}&0&0\\0&R_{h,max}&0\\0&0&R_{h,max}\end{bmatrix}$$

$$E=\begin{bmatrix}x_e\\y_e\\z_e\end{bmatrix},\quad R_{e,max}=\begin{bmatrix}x_{e,max}&0&0\\0&y_{e,max}&0\\0&0&z_{e,max}\end{bmatrix}$$

$$E=\frac{R_{e,max}}{R_{h,max}}H'\ (\text{if } |\alpha|<\alpha_{limit})$$

Referring to <Equation 6> shown above, the machine operating position E can be acquired. At this time, $R_{e,max}$ represents a maximum radius to which the end part of the arm of the excavator is movable, $R_{h,max}$ represents a maximum radius to which the wrist position H of the operator is movable, and $\alpha$ represents an angle of the wrist position H of the operator in ±Y-axis directions on the basis of the X axis on the XY plane of the remote coordinate system.

Thereafter, in step S702, the tracked machine operating position E is wirelessly transmitted to the construction machine 210.

In the present disclosure, it is examined whether swing is driven before executing the position tracking mode or the approximate position tracking mode, and if swing is driven, the position tracking mode or the approximate position tracking mode is not executed. To this end, it is examined whether swing is driven before step S700, and only if swing is not driven, the process proceeds to step S700 to execute the operation for the approximate position tracking mode.

Absolute Swing Mode

When the wrist position H of the operator belongs to the absolute swing area, it is sensed that there is a request for executing the swing operation in step S800, a swing velocity is calculated in proportion to an approximate degree of the wrist position H to the Y axis, and the calculated swing velocity is wirelessly transmitted to the construction machine to thereby control the upper swing body to swing. An another exemplary embodiment, the upper swing body may be set to be driven at a predetermined swing velocity regardless of the approximate degree of the wrist position H to the Y axis.

That is, when the wrist position H is positioned on the Y axis, the construction machine is controlled to swing at a predetermined maximum velocity, and when the wrist position H is positioned at the furthest location on the Y axis, a predetermined minimum velocity is wirelessly transmitted to the construction machine to thereby control the upper swing body to swing.

Further, when the wrist position H belongs to the swing area, the swing velocity varying in proportion to the approximate degree to the Y axis is calculated within the minimum velocity range and the maximum velocity range with respect to the wrist position H and the calculated swing velocity is wirelessly transmitted to the construction machine 210 to thereby control the upper swing body to swing.

Thereafter, the process proceeds to step S802 to examine whether the wrist position H of the operator deviates from the absolute swing area, and when the wrist position H deviates from the absolute swing area, a swing operation stopping command is wirelessly transmitted to the construction machine 210 to thereby control the swing of the upper swing body to stop.

The process proceeds to step S806 to execute the position tracking mode for tracking the machine operating position E again. At this time, the machine coordinate system rotates at the angle to execute the swing operation to be initialized.

However, when the wrist position H is positioned within the absolute swing area λ, the upper swing body is controlled to swing continuously.

In the present disclosure, even though there is an input for executing the absolute swing mode, when the boom and the arm operate, swing is prevented from being driven. To this end, it may be examined whether the boom or the arm is driven before executing step S800. If the boom or the arm is driven, the absolute swing mode is not executed.

Referring back to FIG. 4, if there is a remote control terminating request while executing all of the position tracking mode, the approximate position tracking mode, and the absolute swing mode, the process is terminated and if not, the process proceeds to step 404 to perform the remote control operation continuously.

As described above, in the present disclosure, driving and control variables of the operation device are matched with each other in the remote control unit 80 and thereafter, a type, a machine driving position E, and a driving velocity of the operation device to be driven finally are calculated and transmitted to the remote control unit 80 so as to minimally modify a program of the machine control unit 90 of the existing construction machine and apply the remote control system. However, according to set-up, the remote control unit 80 wirelessly transmits to the construction machine only signals depending on signals sensed by a plurality of sensors and the machine control unit 90 of the construction machine calculates the type, machine driving position E, and driving velocity of the operation device to be driven after matching of the driving and the control variables of the operation device performed in the remote control unit 80 to thereby control the corresponding operation device to be driven.

As described above, although certain exemplary embodiments of the present disclosure has been described in detail, it is to be understood by those skilled in the art that the spirit and scope of the present disclosure are not limited to the certain exemplary embodiments, but are intended to cover various modifications and changes without departing from the gist.

Accordingly, since the above-mentioned exemplary embodiments are provided to inform those skilled in the art of the scope of the present disclosure, it should be understood that they are exemplary in all aspects and not limited and the present disclosure is just defined by the scope of the appended claims.

The present disclosure can be applied to a system that remotely controls a construction machine.

The invention claimed is:

1. A remote control system of a construction machine, comprising:

a remote device including a plurality of sensors for sensing a finger bending angle $\beta_h$ with respect to a palm of an operator and a wrist position H of the operator, a remote control unit tracking an operation angle $\beta_e$ of a bucket depending on the finger bending angle $\beta_h$ with respect to the palm of the operator and a machine operating position E depending on the wrist position H of the operator, and a remote wireless transmitting and receiving unit wirelessly transmitting the tracked operation angle $\beta_e$ of the bucket or the machine operating position E to the construction machine; and a construction machine including an operation device including a boom, an arm, and a bucket, and an upper swing body, and controlling driving of the upper swing body or the operation device depending on the operation angle $\beta_e$ of the bucket or the machine operating position E received from the remote device, wherein the remote device generates an absolute coordinate system using a rotational center point of an arm of the operator as an original point for setting a workspace, sets a predetermined angle in a Y-axis direction on the basis of an X axis in an area within a radius smaller than an inputted maximum radius by a predetermined size on an XY plane as the workspace when a maximum distance to which a wrist reaches in each direction axis of an anteroposterior direction X, a horizontal direction Y, and a longitudinal direction Z is inputted, and thereafter, matches a remote coordinate system and a machine coordinate system depending on the set workspace each other.

2. The remote control system of a construction machine according to claim 1, wherein the construction machine drives the upper swing body or the operation device by setting a driving velocity based on predetermined acceleration at the time of driving the upper swing body or the operation device to the machine operating position E.

3. The remote control system of a construction machine according to claim 1, wherein a partial area approximate to the Y axis outside the workspace on the XY plane is set as an absolute swing area λ, and when the wrist of the operator enters the absolute swing area λ in the workspace, tracking a movement position of the wrist of the operator stops and only a movement direction is tracked to swing the upper swing body at a predetermined swing velocity.

4. The remote control system of a construction machine according to claim 2, wherein the remote device transmits a swing operation stopping command to the construction machine through the remote wireless transmitting and receiving unit when the wrist position H of the operator deviates from the absolute swing area λ.

5. The remote control system of a construction machine according to claim 4, wherein the remote device calculates the swing velocity as a maximum velocity previously set for absolute swing when the wrist position H is positioned on the Y axis and calculates the swing velocity as a minimum velocity previously set for absolute swing when the wrist position H is positioned at the furthest location on the Y axis in the absolute swing area λ, calculates the swing velocity varying depending on an approximate degree to the Y axis within the minimum velocity range and the maximum velocity range with respect to the wrist position H when the wrist position H is positioned between the furthest location on the Y axis and within the Y axis, and transmits a command for continuously performing the swing operation at the calculated swing velocity to the construction machine through the remote wireless transmitting and receiving unit.

6. The remote control system of a construction machine according to claim 1, wherein the remote device sets a position H' approximated to a point the closest to the workspace as the wrist position H of the operator when the wrist position H of the operator deviates from the set workspace.

7. The remote control system of a construction machine according to claim 1, wherein the remote device previously sets an approximate area in the workspace, tracks a velocity and a direction by using a previous velocity and a direction component when the wrist position H of the operator belongs to the approximate area, and wirelessly transmits the tracked velocity and direction information to the construction machine through the remote wireless transmitting and receiving unit.

8. A remote control method of a construction machine for remotely controlling the construction machine including an operation device including a boom, an arm, and a bucket and an upper swing body in a remote area, the method comprising:

receiving, by a remote device, a maximum distance to which a wrist is reachable in each direction axis of an anteroposterior direction X, a horizontal direction Y, and a longitudinal direction Z and setting a radius based on a distance smaller than the received maximum distance by a predetermined size as a workspace, and setting a predetermined area on an XY plane as an absolute swing area λ;

tracking an operation angle $\beta_e$ of the bucket to track the operation angle $\beta_e$ of the bucket depending on a finger bending angle $\beta_h$ with respect to a palm of the operator and wirelessly transmit the tracked information to the construction machine;

executing a position tracking mode to track a machine operating position E and wirelessly transmit the tracked information to the construction machine when a wrist position H of the operator belongs to the workspace;

executing an absolute swing mode to recognize that a request for a swing operation is received from the operator and wirelessly transmit the swing operation request to the construction machine when the wrist position H of the operator belongs to the absolute swing area;

executing an approximate position tracking mode to track the machine operating position E by setting a position H' approximated to a point the closest to the workspace as the wrist position H of the operator and wirelessly transmit the tracked information to the construction machine when the wrist position H of the operator deviates from the workspace and the absolute swing area; and controlling, by the construction machine, driving of the operation device and the upper swing body in accordance with the tracking information or the swing operation request that is received from the remote device.

9. The remote control method of a construction machine according to claim 8, wherein in the tracking of the operation angle $\beta_e$ of the bucket, the operation angle $\beta_e$ of the bucket is tracked by compensating for a predetermined value with respect to the finger bending angle $\beta_h$ with respect to the palm of the operator and when the compensated value is more than a maximum value of the operation angle $\beta_e$ of the bucket, the compensated value is tracked as the maximum value of the operation angle $\beta_e$ of the bucket.

10. The remote control method of a construction machine according to claim 8, wherein in the executing of the absolute swing mode, a command for continuously performing the swing operation is transmitted to the construction machine when the wrist position H of the operator belongs to the absolute swing area λ and a swing operation stopping command is transmitted to the construction machine through the remote wireless transmitting and receiving unit when the wrist position H of the operator deviates from the absolute swing area λ.

11. A remote control method of a construction machine for remotely controlling the construction machine including an operation device including a boom, an arm, and a bucket and an upper swing body in a remote area, the method comprising:

receiving, by a remote device, a maximum distance to which a wrist is reachable in each direction axis of an anteroposterior direction X, a horizontal direction Y, and a longitudinal direction Z and setting a radius based on a distance smaller than the received maximum distance by a predetermined size as a workspace, and setting a predetermined area on an XY plane as an absolute swing area λ;

tracking an operation angle $\beta_e$ of the bucket to track the operation angle $\beta_e$ of the bucket depending on a finger bending angle $\beta_h$ with respect to a palm of the operator and wirelessly transmit the tracked information to the construction machine;

executing a position tracking mode to judge whether the upper swing body is driven when a wrist position H of the operator belongs to the workspace and only when the upper swing body is not driven, track a machine operating position E and wirelessly transmit the tracked information to the construction machine;

executing an absolute swing mode to judge whether at least one of the boom and the arm is driven when the wrist position H of the operator belongs to the absolute swing area and only when the boom and the arm are not driven, wirelessly transmit a swing operation request to the construction machine;

executing an approximate position tracking mode to judge whether the upper swing body is driven when the wrist position H of the operator deviates from the workspace and the absolute swing area and only when the upper swing body is not driven, set a position H' approximated to the closest point to the workspace as the wrist position H of the operator and track the machine operating position E, and wirelessly transmit the tracked information to the construction machine; and controlling, by the construction machine, driving of the operation device and the upper swing body in accordance with the tracking information or the swing operation request that is received from the remote device.

* * * * *

UNITED STATES PATENT AND TRADEMARK OFFICE
CERTIFICATE OF CORRECTION

PATENT NO. : 8,195,344 B2
APPLICATION NO. : 13/142241
DATED : June 5, 2012
INVENTOR(S) : Jin Suk Song et al.

It is certified that error appears in the above-identified patent and that said Letters Patent is hereby corrected as shown below:

In the Specification

Column 8,

Line 7, delete "$X_{h,mux}$, $Y_{h,mux}$, and $Z_{h,mux}$" and insert --$X_{h,max}$, $Y_{h,max}$, and $Z_{h,max}$--.

Line 14, delete "$R_{h,mux}$" and insert --$R_{h,max}$--.

Line 16, delete "$r_{h,mux}$" and insert --$r_{h,max}$--.

Line 19, delete "$r_{h,mux}$" and insert --$r_{h,max}$--.

Line 20, delete "$R_{h,mux}$" and insert --$R_{h,max}$--.

Line 22, delete "$r_{h,mux}$" and insert --$r_{h,max}$--.

Line 27, delete "$R_{h,mux} \cong X_{h,mux} \cong Y_{h,mux} \cong Z_{h,mux}$" and insert --$R_{h,max} \cong X_{h,max} \cong Y_{h,max} \cong Z_{h,max}$--.

Line 29, delete "$r_{h,mux} = \in_h R_{h,mux}(\in_h \leqq 1)$" and insert --$r_{h,max} = \in_h R_{h,max}(\in_h \leqq 1)$--.

Line 31, delete "$r_{h,mux}$" and insert --$r_{h,max}$--.

Line 33, delete "$r_{h,mux}$" and insert --$r_{h,max}$--.

Line 37, delete "$r_{h,mux}$" and insert --$r_{h,max}$--.

Line 38, delete "$R_{h,mux}$" and insert --$R_{h,max}$--.

Signed and Sealed this
Twenty-fourth Day of September, 2013

Teresa Stanek Rea
*Deputy Director of the United States Patent and Trademark Office*